United States Patent
Rajendiran et al.

(10) Patent No.: US 11,088,963 B2
(45) Date of Patent: Aug. 10, 2021

(54) AUTOMATIC AGGREGATED NETWORKING DEVICE BACKUP LINK CONFIGURATION SYSTEM

(71) Applicant: Dell Products L.P., Round Rock, TX (US)

(72) Inventors: Ganapathi Rajendiran, Tamil Nadu (IN); Goutham Sundar Selvaraj, Tamil Nadu (IN); Sriraghav Kameswaran, Tamil Nadu (IN); Kannan Karuppiah, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/715,107

(22) Filed: Dec. 16, 2019

(65) Prior Publication Data

US 2021/0184987 A1     Jun. 17, 2021

(51) Int. Cl.
  *H04L 12/911*   (2013.01)
  *H04L 12/891*   (2013.01)
  *H04L 12/26*    (2006.01)
  *H04L 29/12*    (2006.01)
  *H04L 12/24*    (2006.01)

(52) U.S. Cl.
  CPC ............ *H04L 47/728* (2013.01); *H04L 41/22* (2013.01); *H04L 43/10* (2013.01); *H04L 47/41* (2013.01); *H04L 47/82* (2013.01); *H04L 61/6059* (2013.01)

(58) Field of Classification Search
  None
  See application file for complete search history.

(56) References Cited

U.S. PATENT DOCUMENTS

| | | | |
|---|---|---|---|
| 2004/0174887 A1* | 9/2004 | Lee ..................... | H04L 12/462 370/395.53 |
| 2013/0250829 A1* | 9/2013 | Kurokawa ........ | H04W 52/0274 370/311 |
| 2013/0308471 A1* | 11/2013 | Krzanowski ........ | H04L 43/0811 370/252 |
| 2014/0160919 A1* | 6/2014 | Kar .................... | H04W 24/04 370/220 |
| 2014/0204729 A1* | 7/2014 | Zhang ................ | H04L 41/0672 370/218 |

(Continued)

*Primary Examiner* — Edan Orgad
*Assistant Examiner* — Emmanuel K Maglo
(74) *Attorney, Agent, or Firm* — Haynes and Boone, LLP (57) ABSTRACT

An automatic aggregated networking device backup link configuration system includes a first networking device having first interfaces, and a second networking device having second interfaces. The first networking device receives second networking device information via at least some of the first interfaces coupled via respective Inter-Chassis Links (ICLs) in an aggregated ICL to respective ones of the second interfaces, and uses the second networking device information to determine that each of the at least some of the first interfaces provide the aggregated ICL to the second networking device. The first networking device then identifies one of the first interfaces that is coupled to a respective one of the second interfaces by a link that is not part of the aggregated ICL, and automatically configures the one of the first interfaces to provide the link that is not part of the aggregated ICL as a backup link.

18 Claims, 7 Drawing Sheets

(56) References Cited

U.S. PATENT DOCUMENTS

| | | | | |
|---|---|---|---|---|
| 2017/0230265 A1* | 8/2017 | Mishra | ............... | H04L 41/0672 |
| 2018/0331855 A1* | 11/2018 | Subramanian | ...... | H04L 12/4625 |
| 2018/0351855 A1* | 12/2018 | Sood | ....................... | H04L 45/28 |
| 2019/0028366 A1* | 1/2019 | Wu | ......................... | H04L 43/02 |
| 2020/0205035 A1* | 6/2020 | Han | ................. | H04W 28/0284 |

* cited by examiner

FIG. 7

US 11,088,963 B2

AUTOMATIC AGGREGATED NETWORKING DEVICE BACKUP LINK CONFIGURATION SYSTEM

BACKGROUND

The present disclosure relates generally to information handling systems, and more particularly to automatically configuring backup links for aggregated networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes aggregated to provide a logical switch device that operates using a combination of the resources of those switch devices, while providing redundancy in the event any of those switch devices become unavailable. For example, switch devices may be aggregated using Virtual Link Trunking (VLT), which is a proprietary aggregation protocol available in switch devices provided by DELL® Inc. of Round Rock, Tex., United States, and provides a layer 2 (L2) link aggregation protocol between end computing devices (e.g., server devices) connected to one or more aggregated switch devices (called "VLT peer switch devices"), while providing a redundant, load-balancing connection to a core network in a loop-free environment in a manner that eliminates the need to use the Spanning Tree Protocol (STP). In one common VLT configuration, a pair of VLT switch devices that are each coupled to core switch devices in the core network will also be coupled together via an aggregated Inter-Chassis Link (ICL) (called a "VLT interconnect" or "VLTi") that is made up of multiple ICLs, as well as each coupled to a server device by respective Link Aggregation Group (LAG) (called a "VLT port channel") that is made up of multiple links. In addition, the VLT peer devices may also be coupled together by a "backup link" that is primarily utilized to transmit heartbeat information between the VLT peer devices so that each VLT peer device can determine the availability of the other VLT peer device. However, the conventional configuration of the backup link between VLT peer devices is a manual process, and thus is time consuming and prone to error.

Accordingly, it would be desirable to provide an automatic aggregated networking device backup link configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a automatic backup link configuration engine that is configured to: receive, via at least some of a plurality of first interfaces that are each coupled via a respective inter-chassis link in an aggregated inter-chassis link to respective ones of a plurality of second interfaces on a second networking device, second networking device information; determine, using the second networking device information, that each of the at least some of the plurality of first interfaces provide the aggregated inter-chassis link to the second networking device; identify one of the plurality of first interfaces that is coupled to a respective one of the plurality of second interfaces by a link that is not part of the aggregated inter-chassis link; and automatically configure the one of the plurality of first interfaces to provide the link that is not part of the aggregated inter-chassis link as a backup link.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
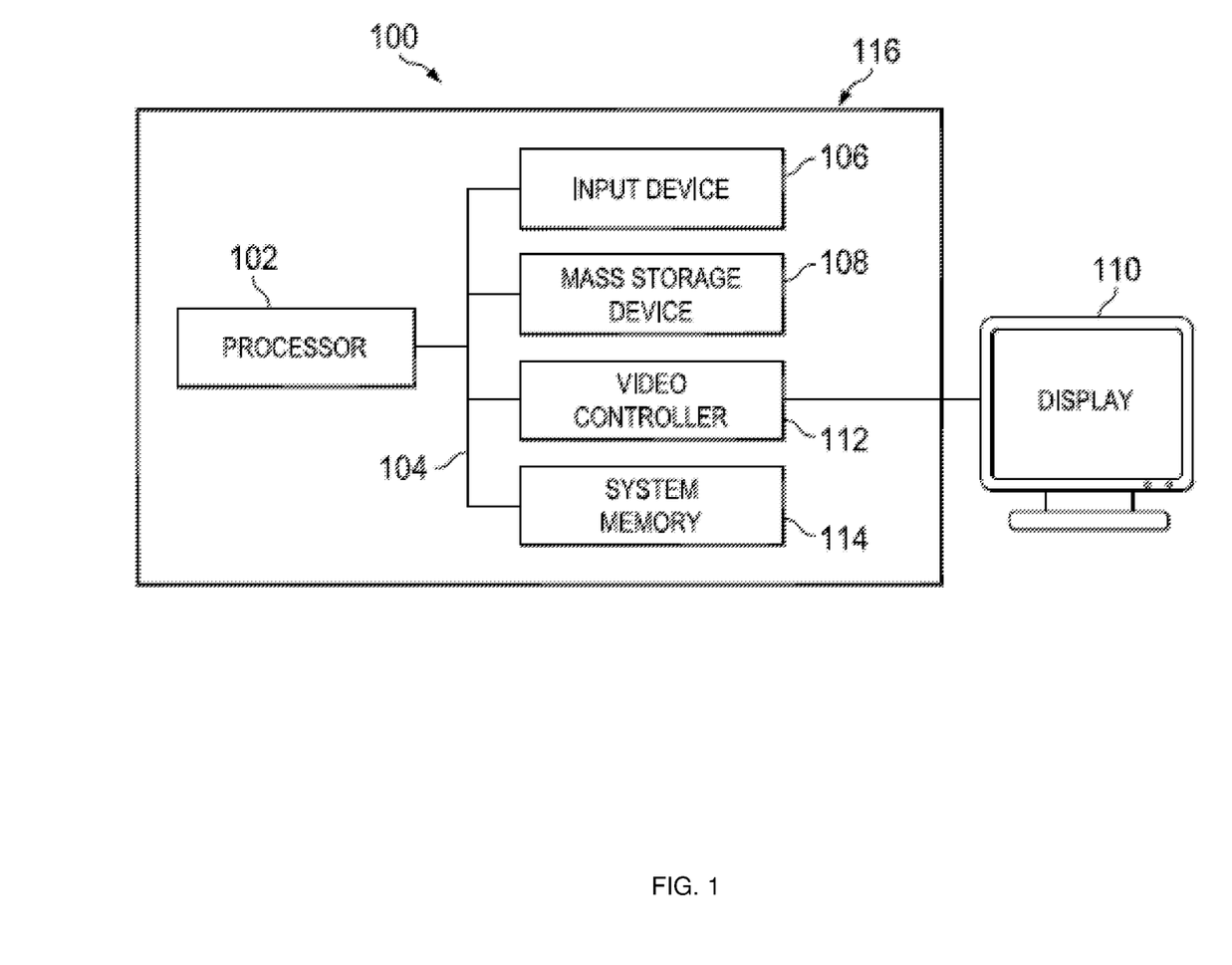
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
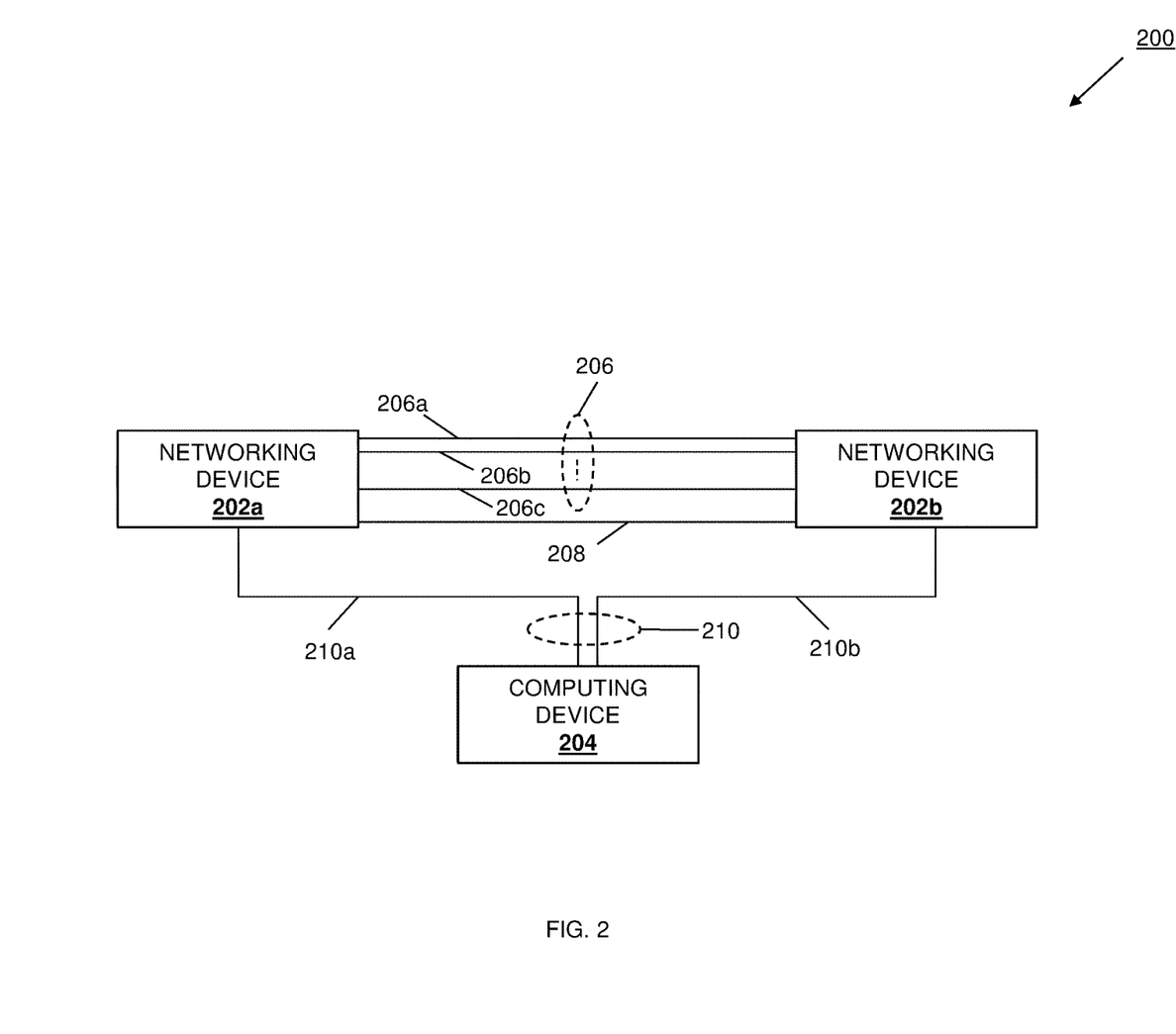
FIG. 2 is a schematic view illustrating an embodiment of an automatic aggregated networking device backup link configuration system.
Figure 3:
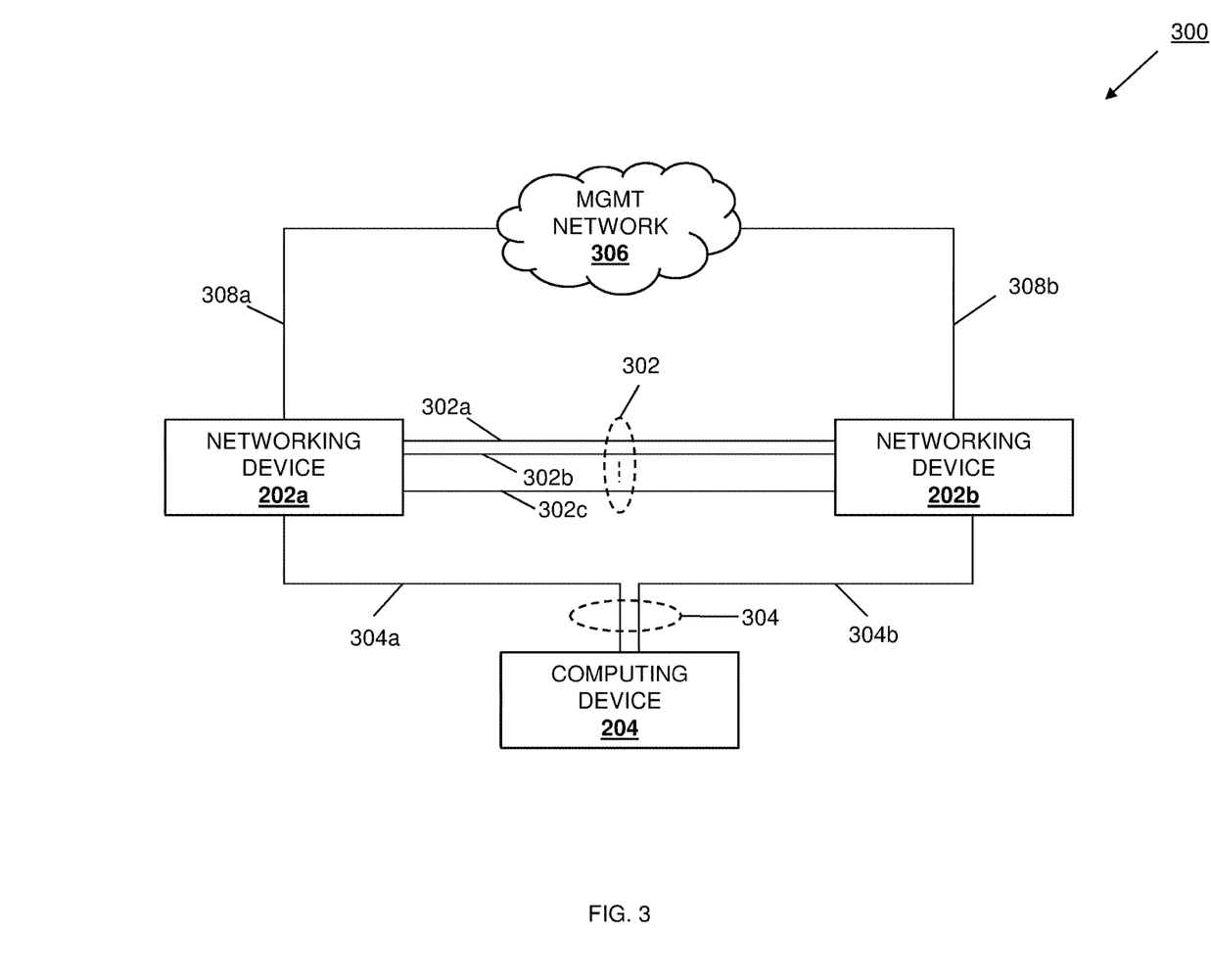
FIG. 3 is a schematic view illustrating an embodiment of an automatic aggregated networking device backup link configuration system

Referring now to FIGS. 2 and 3, different embodiments of an automatic aggregated networking device backup link configuration system are illustrated. In the embodiments illustrated in FIGS. 2 and 3, respective automatic aggregated networking device backup link configuration systems 200 and 300 each include a pair of networking devices 202a and 202b coupled to each other, with each of those networking devices 202a and 202b coupled to a computing device 204 such as, for example, a server device. In an embodiment, either or both of the networking devices 202a and 202b may be provided by the IHS 100 discussed above with reference to FIG. 1, and/or may include some or all of the components of the IHS 100, and in specific examples may each be provided by switch devices. For example, each of the networking devices 202a and 202b may be provided by Virtual Link Trunking (VLT) peer switch devices that operate according to the VLT protocol, discussed above. However, while illustrated and discussed as VLT peer switch devices, one of skill in the art in possession of the present disclosure will recognize that networking devices provided in the automatic aggregated networking device backup link configuration system 200 may include any devices that may be configured to operate similarly as the networking devices 202a and 202b discussed below.

In the embodiment of the automatic aggregated networking device backup link configuration system 200 illustrated in FIG. 2, the networking devices 202a and 202b are coupled together by a plurality of inter-chassis links 206a, 206b, and up to 206c, each of which is provided in an aggregated inter-chassis link 206 as discussed in further detail below. Continuing with the example discussed above in which the networking devices 202a and 202b are VLT peer devices, the aggregated inter-chassis link 206 may be provided by a VLT interconnect (VLTi). Furthermore, the networking devices 202a and 202b in the automatic aggregated networking device backup link configuration system 200 illustrated in FIG. 2 are also coupled together by a link 208 that is not part of the aggregated inter-chassis link 206. In some embodiment, the link 208 between the networking devices 202a and 202b in the automatic aggregated networking device backup link configuration system 200 illustrated in FIG. 2 that is not part of the aggregated inter-chassis link 206 may be provided by a Layer 3 (L3) link.

For example, each of the networking devices 202a and 202b in the automatic aggregated networking device backup link configuration system 200 illustrated in FIG. 2 may include a plurality of inter-chassis interfaces, with inter-chassis interfaces on the networking device 202a coupled to respective inter-chassis interfaces on the networking device 202b (e.g., via respective Ethernet cables) to provide each of the inter-chassis links 206a, 206b, and up to 206c, and an inter-chassis interface on the networking device 202a coupled to a respective inter-chassis interface on the networking device 202b (e.g., via an Ethernet cable) to provide the link 208. In a specific examples, any pair of the inter-chassis interfaces on the networking devices 202a and 202b in the automatic aggregated networking device backup link configuration system 200 illustrated in FIG. 2 may be capable of providing an inter-chassis link that may be included in the aggregated inter-chassis link 206, and FIG. 2 illustrates a situation in which the link 208 is provided between a pair of the inter-chassis interfaces on the networking devices 202a and 202b, but has not been included in the aggregated inter-chassis link 206.

In the embodiment of the automatic aggregated networking device backup link configuration system 200 illustrated in FIG. 2, the networking devices 202a and 202b are also each coupled to the computing device 204 by respective links 210a and 210b that have been provided in a Link Aggregation Group (LAG) 210. Continuing with the example discussed above in which the networking devices 202a and 202b are VLT peer devices, the LAG 210 may be provided by a VLT port channel. However, while a specific automatic aggregated networking device backup link configuration system 200 has been illustrated and described, one of skill in the art in possession of the present disclosure will recognize that the automatic aggregated networking device backup link configuration system of the present disclosure may include a variety of components and component configurations while remaining within the scope of the present disclosure as well.

In the embodiment of the automatic aggregated networking device backup link configuration system 300 illustrated in FIG. 3, the networking devices 202a and 202b are coupled together by a plurality of inter-chassis links 302a, 302b, and up to 302c, each of which is provided in an aggregated inter-chassis link 302 as discussed in further detail below. Continuing with the example discussed above in which the networking devices 202a and 202b are VLT peer devices, the aggregated inter-chassis link 302 may be provided by a VLT interconnect (VLTi). For example, each of the networking devices 202a and 202b in the automatic aggregated networking device backup link configuration system 300 illustrated in FIG. 3 may include a plurality of inter-chassis interfaces, with each inter-chassis interface on the networking device 202a coupled to a respective inter-chassis interface on the networking device 202b (e.g., via a respective Ethernet cable) to provide each of the inter-chassis links 302a, 302b, and up to 302c.

In a specific examples, any pair of the inter-chassis interfaces on the networking devices 202a and 202b in the automatic aggregated networking device backup link configuration system 300 illustrated in FIG. 3 may be capable of providing an inter-chassis link that may be included in the aggregated inter-chassis link 302, and FIG. 3 illustrates a situation in which all of the links provided between pairs of the inter-chassis interfaces on the networking devices 202a and 202b are included in the aggregated inter-chassis link 302. In the embodiment of the automatic aggregated networking device backup link configuration system 300 illustrated in FIG. 3, the networking devices 202a and 202b are also each coupled to the computing device 204 by respective links 304a and 304b that have been provided in a Link Aggregation Group (LAG) 304. Continuing with the example discussed above in which the networking devices 202a and 202b are VLT peer devices, the LAG 304 may be provided by a VLT port channel.

Furthermore, in the embodiment of the automatic aggregated networking device backup link configuration system 300 illustrated in FIG. 3, the networking devices 202a and 202b are also each coupled to a management network 306 via respective management links 308a and 308b. For example, each of the networking devices 202a and 202b in the automatic aggregated networking device backup link configuration system 300 illustrated in FIG. 3 may include a respective management interface, with the management interface on the networking device 202a coupled to the management network 306 (e.g., via an Ethernet cable) to provide the management link 308a, and the management interface on the networking device 202b coupled to the management network 306 (e.g., via an Ethernet cable) to provide the management link 308b. However, while a specific automatic aggregated networking device backup link configuration system 300 has been illustrated and described, one of skill in the art in possession of the present disclosure will recognize that the automatic aggregated networking device backup link configuration system of the present disclosure may include a variety of components and component configurations while remaining within the scope of the present disclosure as well.

Figure 4:
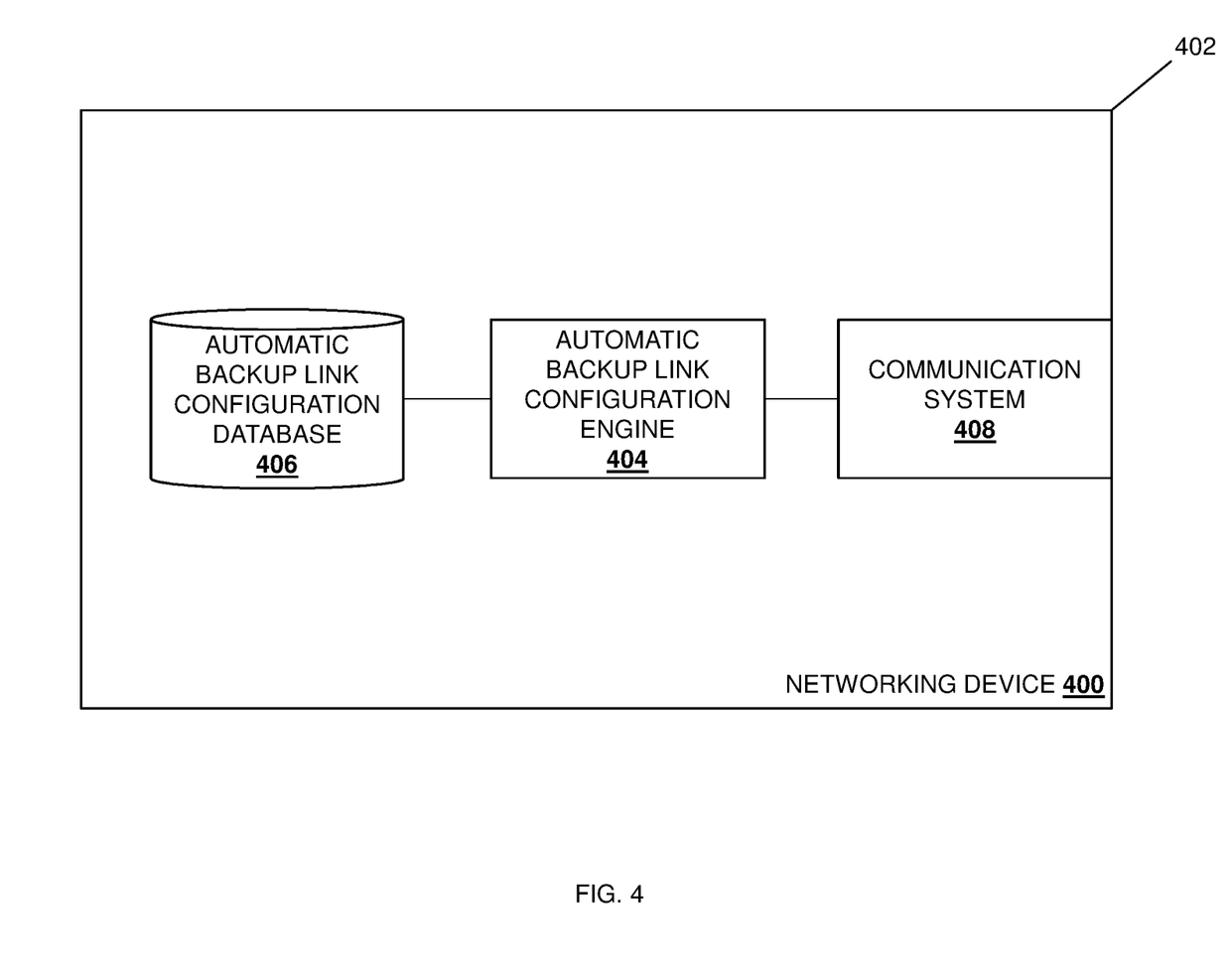
FIG. 4 is a schematic view illustrating an embodiment of a networking device that may be provided in the automatic aggregated networking device backup link configuration systems of FIGS. 2 and 3.

Referring now to FIG. 4, an embodiment of a networking device 400 is illustrated that may provide either or both of the networking devices 202a and 202b discussed above with reference to FIG. 2. As such, the networking device 400 may be provided by the IHS 100 discussed above with reference to FIG. 1 and/or may include some or all of the components of the IHS 100, and in specific examples may be provided by a switch device such as a VLT peer switch device. However, while illustrated and discussed as a VLT peer switch device, one of skill in the art in possession of the present disclosure will recognize that the functionality of the networking device 400 discussed below may be provided by other devices that are configured to operate similarly as the networking device 400 discussed below. In the illustrated embodiment, the networking device 400 includes a chassis 402 that houses the components of the networking device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an automatic backup link configuration engine 404 that is configured to perform the functionality of the automatic backup link configuration engines and/or networking devices discussed below.

The chassis 402 may also house a storage system (not illustrated, but which may include the storage 108 discussed above with reference to FIG. 1) that is coupled to the automatic backup link configuration engine 404 (e.g., via a coupling between the storage system and the processing system) and that includes an automatic backup link configuration database 406 that is configured to store any of the information utilized by the automatic backup link configuration engine 404 discussed below. The chassis 402 may also house a communication system 408 that is coupled to the automatic backup link configuration engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 408 may include any of the interfaces (e.g., the inter-chassis interfaces, the management interfaces, etc.) discussed herein that may be configured to provide the links described herein. However, while a specific networking device 400 has been illustrated, one of skill in the art in possession of the present disclosure will recognize that networking devices (or other devices operating according to the teachings of the present disclosure in a manner similar to that described below for the networking device 400) may include a variety of components and/or component configurations for providing conventional networking device functionality, as well as the functionality discussed below, while remaining within the scope of the present disclosure as well.

Figure 5:
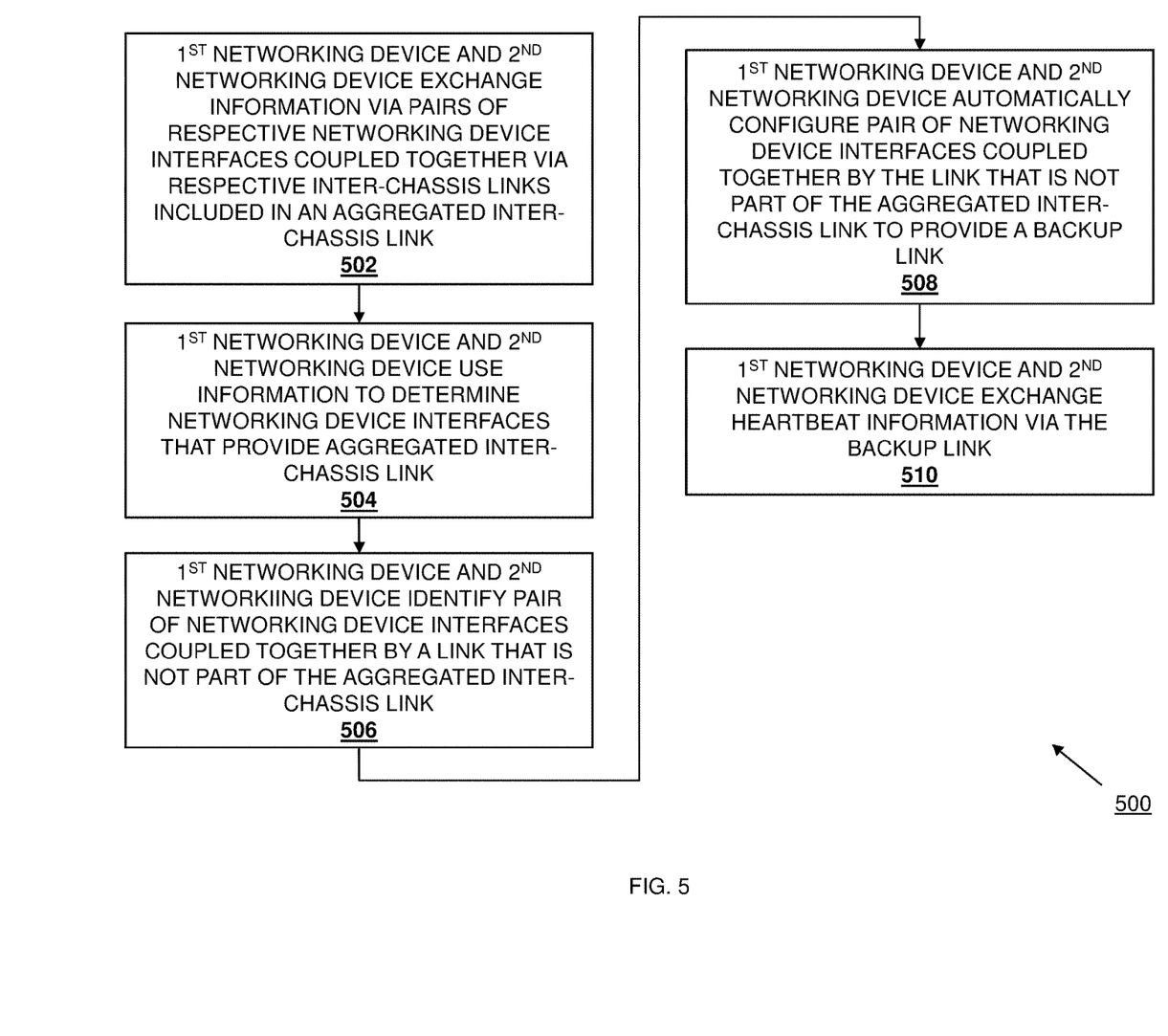
FIG. 5 is a flow chart illustrating an embodiment of a method for automatically configuring backup links for aggregated networking devices.

Referring now to FIG. 5, an embodiment of a method 500 for automatically configuring backup links for aggregated networking devices is illustrated. As discussed below, the systems and methods of the present disclosure provide for the automatic configuration of a backup link between aggregated networking devices. For example, a pair of aggregated networking devices may be provided with a respective inter-chassis links between respective pairs of inter-chassis interfaces on each of the aggregated networking devices, and an aggregated inter-chassis link may be configured between the aggregated networking devices using those inter-chassis links. The aggregated networking devices may then exchange networking device information using the inter-chassis links in the aggregated inter-chassis link, and each aggregated networking device may then use that networking device information to determine each of its inter-chassis interfaces that are operating to provide the aggregated inter-chassis link (e.g., by being configured to provide an inter-chassis link to the other aggregated networking device that is included in the aggregated inter-chassis link.) Each aggregated networking device may then identify whether it includes an inter-chassis interface that is connected to the other aggregated networking device by a link that is not part of the aggregated inter-chassis link and, if so, enable a link local IPv6 address on that inter-chassis interface, and retrieve the link local IPv6 address from the inter-chassis interface on the other aggregated networking device that is connected via the link that is not part of the aggregated inter-chassis link. Each aggregated networking device may then utilize the link local IPv6 addresses associated with the inter-chassis interfaces that provide the link that is not part of the aggregated inter-chassis link in order to automatically configure that link as a backup link that may be subsequently utilized to exchange heartbeat communications between the aggregated networking devices.

In the event the aggregated networking device do not identify any inter-chassis interface that are connected to the other aggregated networking device by a link that is not part of the aggregated inter-chassis link (i.e., all links available via the inter-chassis interfaces are inter-chassis links that are included in the aggregated inter-chassis link), each of the aggregated networking devices may use the networking device information (e.g., management IP addresses) to identify a pair management interfaces on the aggregated networking devices that provide a management link between the aggregated networking devices, and utilize the management IP addresses in order to automatically configure that management link as a backup link that may be subsequently utilized to exchange heartbeat communications between the aggregated networking devices. As such, the manual configuration of backup links between aggregated networking devices is eliminated by providing for automatic configuration of such backup links using either a link between inter-chassis interfaces on the aggregated networking devices that is not part of an aggregated inter-chassis link or, if no link exists between inter-chassis interfaces on the aggregated networking devices that is not part of an aggregated inter-chassis link, using a management link between management interfaces on the aggregated networking devices. As will be appreciated by one of skill in the art in possession of the present disclosure, the automatic configuration of the present disclosure saves time and eliminates errors associated with conventional manual backup link configuration processes.

In the examples provided below, the two automatic aggregated networking device backup link configuration systems 200 and 300 are described as separate configurations upon which the automatic backup link configuration functionality of the present disclosure may operate, with the automatic aggregated networking device backup link configuration system 200 configured such that a link exists between inter-chassis interfaces on the aggregated networking devices that is not part of an aggregated inter-chassis link between those aggregated networking devices, while the automatic aggregated networking device backup link configuration system 300 is configured such that no link exists between inter-chassis interfaces on the aggregated networking devices that is not part of an aggregated inter-chassis link between those aggregated networking devices, while a management link exists between management interfaces on the aggregated networking devices. As such, one of skill in the art in possession of the present disclosure will appreciate that prior to the method 500, the automatic aggregated networking device backup link configuration systems 200 and 300 may be provided in those configurations by a user or administrator of the automatic aggregated networking device backup link configuration system.

Furthermore, one of skill in the art in possession of the present disclosure will recognize how the configurations of the automatic aggregated networking device backup link configuration systems 200 and 300 may be combined. For example, the automatic aggregated networking device backup link configuration system 200 may include the management link illustrated between the management interfaces in the automatic aggregated networking device backup link configuration system 300 (but which is not used as a backup link during the method 500 due to the availability of the link between inter-chassis interfaces on the aggregated networking devices that is not part of an aggregated inter-chassis link between those aggregated networking devices in the automatic aggregated networking device backup link configuration system 200.) As such, a wide variety of modification may be provided to the examples discussed below while remaining within the scope of the present disclosure as well.

The method 500 begins at block 502 where a first networking device and a second networking device exchange information via pairs of respective networking device interfaces that are coupled via respective inter-chassis links included in an aggregated inter-chassis link. In an embodiment, at or prior to block 502 and with reference to the automatic aggregated networking device backup link configuration system 200 of FIG. 2, in response to the startup or other initialization between the networking devices 202a and 202b, the aggregated inter-chassis link 206 made up of the inter-chassis links 206a-206c may be configured using conventional aggregated inter-chassis link configuration techniques that would be apparent to one of skill in the art in possession of the present disclosure. Similarly, at or prior to block 502 and with reference to the automatic aggregated networking device backup link configuration system 300 of FIG. 3, in response to the startup or other initialization between the networking devices 202a and 202b, the aggregated inter-chassis link 302 made up of the inter-chassis links 302a-302c may be configured using conventional aggregated inter-chassis link configuration techniques that would be apparent to one of skill in the art in possession of the present disclosure. Continuing with the specific example above in which the networking devices 202a and 202b are VLT peer switch devices, following the configuration of the VLTi (e.g., provided by the aggregated inter-chassis link), a VLT session may begin.

As such, at block 502, the networking devices 202a and 202b may exchange networking device information via the inter-chassis links that provide the aggregated inter-chassis link, with that networking device information including, for example, the Media Control Access (MAC) address of the networking device transmitting that networking device information, a management Internet Protocol (IP) address of the networking device transmitting that networking device information, and/or any other networking device information that would be apparent to one of skill in the art in possession of the present disclosure. In a specific example, the exchange of networking device information at block 502 may be perform using the Link Layer Discovery Protocol (LLDP), with LLDP communications having Type-Length-Value (TLV) fields including the networking device information (e.g., the MAC address in a first TLV in the LLDP communication, the management IP address in a second TLV in the LLDP communication, etc.) However, while a specific example is provided, one of skill in the art in possession of the present disclosure will appreciate that the networking device information may be exchanged in a variety of manners that will fall within the scope of the present disclosure as well.

Figure 6:
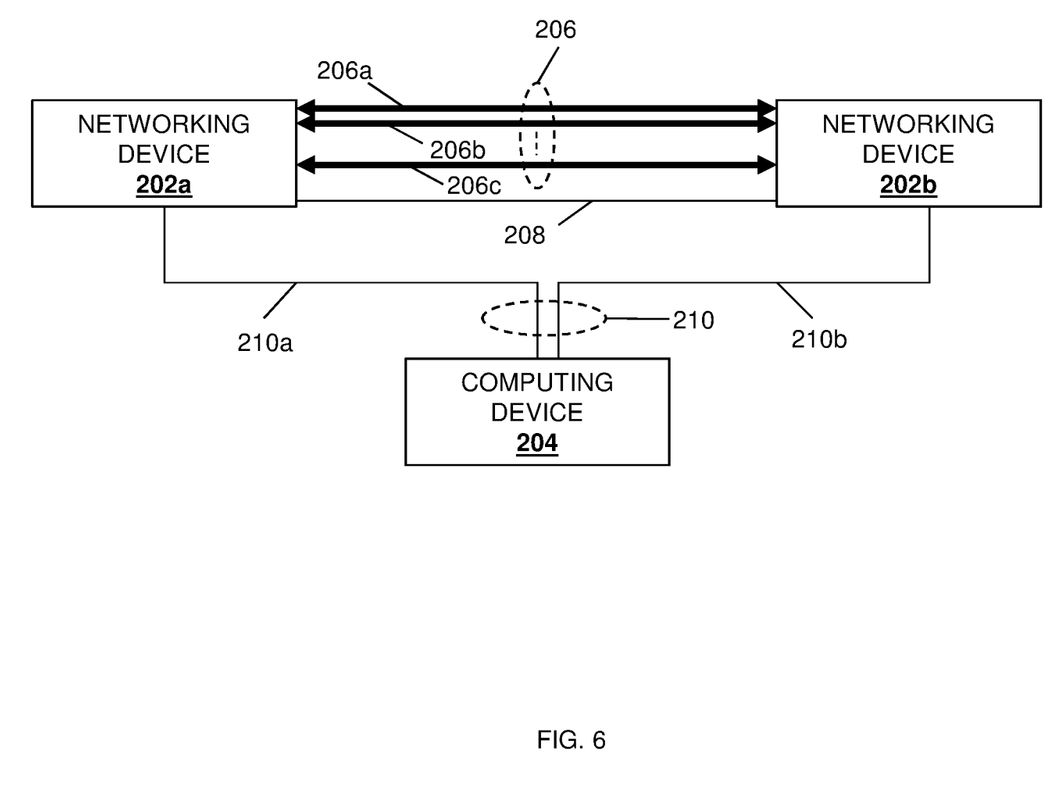
FIG. 6 is a schematic view illustrating an embodiment of the operation of the automatic aggregated networking device backup link configuration system of FIG. 2 during the method of FIG. 5.

Continuing with the specific example of the automatic aggregated networking device backup link configuration system 200 provided in FIG. 2, FIG. 6 illustrates how the automatic backup link configuration engine 404 in the networking device 202a/400 may transmit its networking device information (e.g., the MAC address of the networking device 202a, the management IP address of the networking device 202a, and/or other networking device information in TLVs included in LLDP communications as discussed above) via each of its inter-chassis interfaces in its communication system 408 that are coupled via the respective inter-chassis links 206a-206c included in the aggregated inter-chassis link 206 to the networking device 202b. As such, the automatic backup link configuration engine 404 in the networking device 202b/400 may receive that networking device information from the networking device 202a via each of its inter-chassis interfaces in its communication system 408 that are coupled via the respective inter-chassis links 206a-206c included in the aggregated inter-chassis link 206.

Similarly, FIG. 6 illustrates how the automatic backup link configuration engine 404 in the networking device 202b/400 may transmit its networking device information (e.g., the MAC address of the networking device 202b, the management IP address of the networking device 202b, and/or other networking device information in TLVs included in LLDP communications as discussed above) via each of its inter-chassis interfaces in its communication system 408 that are coupled via the respective inter-chassis links 206a-206c included in the aggregated inter-chassis link 206 to the networking device 202a. As such, the automatic backup link configuration engine 404 in the networking device 202a/400 may receive that networking device information from the networking device 202b via each of its inter-chassis interfaces in its communication system 408 that are coupled via the respective inter-chassis links 206a-206c included in the aggregated inter-chassis link 206.

Figure 7:
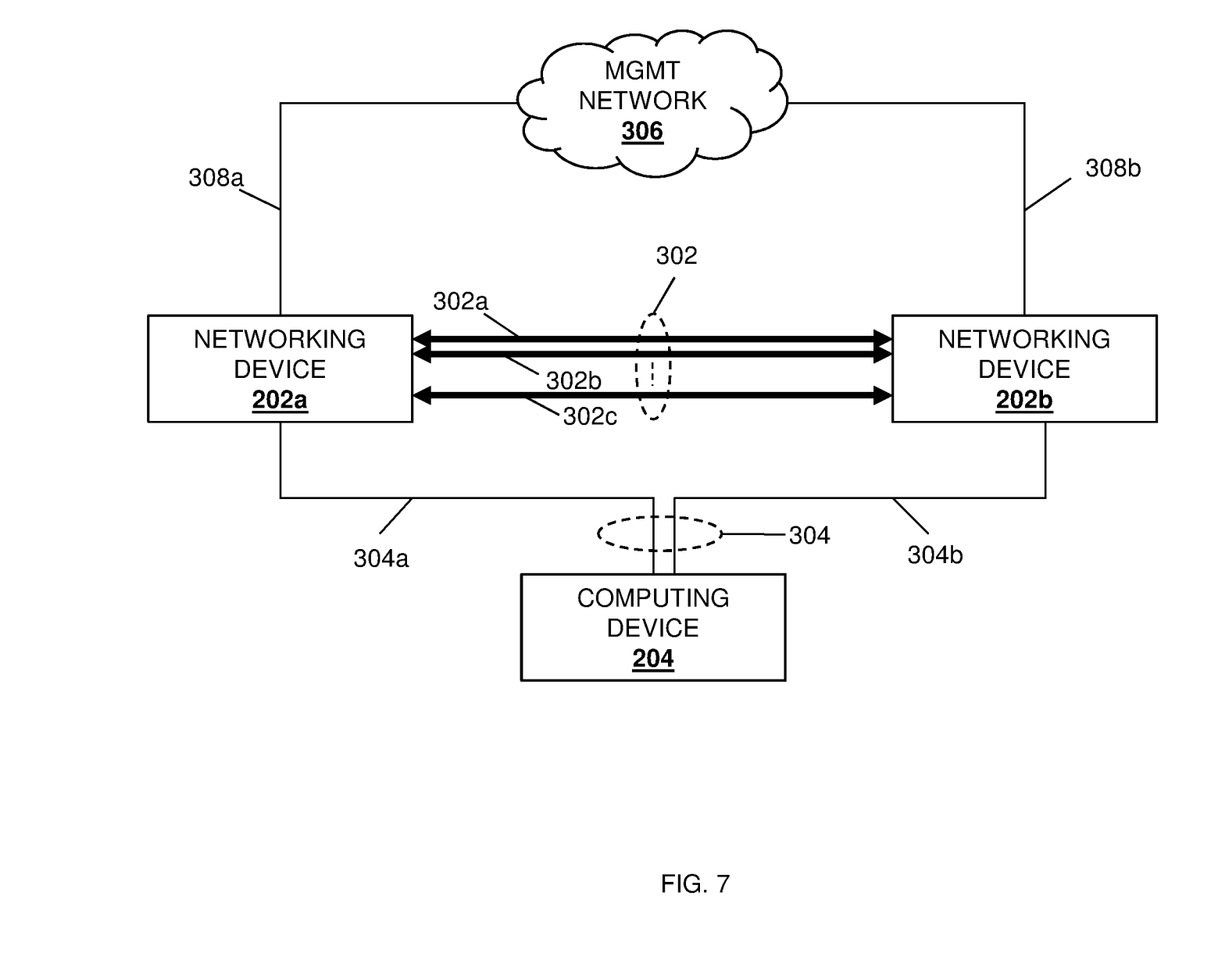
FIG. 7 is a schematic view illustrating an embodiment of the operation of the automatic aggregated networking device backup link configuration system of FIG. 3 during the method of FIG. 5.

Continuing with the specific example of the automatic aggregated networking device backup link configuration system 300 provided in FIG. 3, FIG. 7 illustrates how the automatic backup link configuration engine 404 in the networking device 202a/400 may transmit its networking device information (e.g., the MAC address of the networking device 202a, the management IP address of the networking device 202a, and/or other networking device information in TLVs included in LLDP communications as discussed above) via each of its inter-chassis interfaces in its communication system 408 that are coupled via the respective inter-chassis links 302a-302c included in the aggregated inter-chassis link 302 to the networking device 202b. As such, the automatic backup link configuration engine 404 in the networking device 202b/400 may receive that networking device information from the networking device 202a via each of its inter-chassis interfaces in its communication system 408 that are coupled via the respective inter-chassis links 302a-302c included in the aggregated inter-chassis link 302.

Similarly, FIG. 7 illustrates how the automatic backup link configuration engine 404 in the networking device 202b/400 may transmit its networking device information (e.g., the MAC address of the networking device 202b, the management IP address of the networking device 202b, and/or other networking device information in TLVs included in LLDP communications as discussed above) via each of its inter-chassis interfaces in its communication system 408 that are coupled via the respective inter-chassis links 302a-302c included in the aggregated inter-chassis link 302 to the networking device 202a. As such, the automatic backup link configuration engine 404 in the networking device 202a/400 may receive that networking device information from the networking device 202b via each of its inter-chassis interfaces in its communication system 408 that are coupled via the respective inter-chassis links 302a-302c included in the aggregated inter-chassis link 302.

The method 500 then proceeds to block 504 where the first networking device and the second networking device use the information to determine networking device interfaces that provide the aggregated inter-chassis link. In an embodiment, at block 504, the networking devices 202a and 202b may use each others networking device information that was received at block 502 to determine its inter-chassis interfaces that provide inter-chassis links to the other networking device that are part of the aggregated inter-chassis link.

Continuing with the specific example of the automatic aggregated networking device backup link configuration system 200 provided in FIG. 2, the automatic backup link configuration engine 404 in the networking device 202a/400 may utilize the networking device information received from the networking device 202b at block 502 (e.g., the MAC address of the networking device 202b) to determine its inter-chassis interfaces that provide the inter-chassis links 206a-206c to the networking device 202b (e.g., each of those inter-chassis interfaces provides an inter-chassis link to the same MAC address) that are part of the aggregated inter-chassis link 206, and the automatic backup link configuration engine 404 in the networking devices 202b/400 may utilize the networking device information received from the networking device 202a at block 502 (e.g., the MAC address of the networking device 202a) to determine its inter-chassis interfaces that provide the inter-chassis links 206a-206c to the networking device 202a (e.g., each of those inter-chassis interfaces provides an inter-chassis link to the same MAC address) that are part of the aggregated inter-chassis link 206.

Similarly, continuing with the specific example of the automatic aggregated networking device backup link configuration system 300 provided in FIG. 3, the automatic backup link configuration engine 404 in the networking device 202a/400 may utilize the networking device information received from the networking device 202b at block 502 (e.g., the MAC address of the networking device 202b) to determine its inter-chassis interfaces that provide the inter-chassis links 302a-302c to the networking device 202b (e.g., each of those inter-chassis interfaces provides an inter-chassis link to the same MAC address) that are part of the aggregated inter-chassis link 302, and the automatic backup link configuration engine 404 in the networking devices 202b/400 may utilize the networking device information received from the networking device 202a at block 502 (e.g., the MAC address of the networking device 202a) to determine its inter-chassis interfaces that provide the inter-chassis links 302a-302c to the networking device 202a (e.g., each of those inter-chassis interfaces provides an inter-chassis link to the same MAC address) that are part of the aggregated inter-chassis link 302.

The method 500 then proceeds to block 506 where the first networking device and the second networking device identify a pair of networking device interfaces that are coupled together by a link that is not part of the aggregated inter-chassis link. In an embodiment, at block 506, the networking devices 202a and 202b may each identify a respective inter-chassis interface that provides a link to the other networking device that is not part of the aggregated inter-chassis link. For example, based on the determination by each of the networking devices 202a and 202b of its inter-chassis interfaces that provide inter-chassis links to the other networking device that are part of the aggregated inter-chassis link, each of the networking devices 202a and 202b may operate to identify an inter-chassis interface that provides a link to the other networking device that is not part of that aggregated inter-chassis link. For example, in the illustrated embodiment, among the links present between the networking devices 202a and 202b, the links 206a, 206b, and up to 206c are configured as the aggregated ICL 206. One of skill in the art in possession of the present disclosure will recognize that, based on the aggregated networking device information exchanged between the networking devices 202a and 202b (e.g., the information exchanged via the LLDP communications as discussed above), each the networking devices 202a and 202b will know each other's MAC address. As such, each networking device 202a and 202b may determine whether there are any links to the other networking device (e.g., the link 208 in the illustrated embodiment) that is not part of the aggregated ICL 206 (e.g., a link that delivers aggregated networking device information/LLDP information with the MAC address of the other networking device), which allows each of the networking devices 202a and 202b to identify the link 208 that will be utilized as the backup link as discussed below.

Continuing with the specific example of the automatic aggregated networking device backup link configuration system 200 provided in FIG. 2, the automatic backup link configuration engine 404 in the networking device 202a/400 may identify, based on its determination of the inter-chassis interfaces on the networking device 202a that provide the inter-chassis links 206a-206c to the networking device 202b that are part of the aggregated inter-chassis link 206, the inter-chassis interface that provide the link 208 to the networking device 202b that is not part of the aggregated inter-chassis link 206. Similarly, the automatic backup link configuration engine 404 in the networking devices 202b/400 may identify, based on its determination of the inter-chassis interfaces on the networking device 202b that provide the inter-chassis links 206a-206c to the networking device 202a that are part of the aggregated inter-chassis link 206, the inter-chassis interface that provides the link 208 to the networking device 202a that is not part of the aggregated inter-chassis link 206.

Similarly, continuing with the specific example of the automatic aggregated networking device backup link configuration system 300 provided in FIG. 3, the automatic backup link configuration engine 404 in the networking device 202a/400 may identify, based on its determination of the inter-chassis interfaces on the networking device 202a that provide the inter-chassis links 302a-302c to the networking device 202b that are part of the aggregated inter-chassis link 302, that all links available via its inter-chassis interfaces are part of the aggregated inter-chassis link 302, and may then identify its management interface that provides the management link 308a to the networking device 202b that is via the management network 306 and that is not part of the aggregated inter-chassis link 302. Similarly, the automatic backup link configuration engine 404 in the networking devices 202b/400 may identify, based on its determination of the inter-chassis interfaces on the networking device 202b that provide the inter-chassis links 302a-302c to the networking device 202a that are part of the aggregated inter-chassis link 302, that all links available via its inter-chassis interfaces are part of the aggregated inter-chassis link 302, and may then identify its management interface that provides the management link 308b to the networking device 202a that is via the management network 306 and that is not part of the aggregated inter-chassis link 302.

The method 500 then proceeds to block 508 where the first networking device and the second networking device automatically configure the pair of networking device interfaces that are coupled together by the link that is not part of the aggregated inter-chassis link to provide a backup link. In an embodiment, at block 508, each of the networking devices 202a and 202b may operate to automatically configure their respective networking device interfaces identified at block 506 as providing the link that is not part of the aggregated inter-chassis link such that those networking device interfaces provide a backup link.

Continuing with the specific example of the automatic aggregated networking device backup link configuration system 200 provided in FIG. 2, the automatic backup link configuration engine 404 in the networking device 202a/400 may operate at block 508 to enable a link local IPv6 address on its inter-chassis interface that provides the link 208 that is not part of the aggregated inter-chassis link 206, and the automatic backup link configuration engine 404 in the networking devices 202b/400 may operate at block 508 to enable a link local IPv6 address on its inter-chassis interface that provides the link 208 that is not part of the aggregated inter-chassis link 206. Subsequently, the automatic backup link configuration engine 404 in the networking device 202a/400 may operate (e.g., using Neighbor Discovery Protocol (NDP) communications with the networking device 202b) to retrieve the link local IPv6 address for the inter-chassis interface on the networking device 202b that provides the link 208 that is not part of the aggregated inter-chassis link 206, and the automatic backup link configuration engine 404 in the networking devices 202b/400 may operate (e.g., using NDP communications with the networking device 202a) to retrieve the link local IPv6 address for the inter-chassis interface on the networking device 202a that provides the link 208 that is not part of the aggregated inter-chassis link 206. The automatic backup link configuration engine 404 in each of the networking device 202a/400 may then utilize those link local IPv6 addresses for the inter-chassis interfaces that provide the link 208 that is not part of the aggregated inter-chassis link 206 to automatically configure those inter-chassis interfaces to provide a backup link that is configured to provide for the heartbeat communications, as well as other communications and/or functionality that would be apparent to one of skill in the art in possession of the present disclosure. One of skill in the art in possession of the present disclosure would recognize how to utilize link local IPv6 addresses to configure inter-chassis interfaces to provide a backup link, and thus that process is not discussed in detail herein.

Similarly, continuing with the specific example of the automatic aggregated networking device backup link configuration system 300 provided in FIG. 3, the automatic backup link configuration engine 404 in the networking devices 202a/400 and 202b/400 may operate at block 508 to utilize the management IP addresses exchanged in the networking device information at block 502 to automatically configure their management interfaces to provide a backup link (via a management link provided by the management link 308a, the management network 306, and the management link 308b) that is configured to provide for the heartbeat communications, as well as other communications and/or functionality that would be apparent to one of skill in the art in possession of the present disclosure. One of skill in the art in possession of the present disclosure would recognize how to utilize management IP addresses to configure management interfaces to provide a backup link, and thus that process is not discussed in detail herein.

The method 500 then proceeds to block 510 where the first networking device and the second networking device exchange heartbeat information via the backup link. Continuing with the specific example of the automatic aggregated networking device backup link configuration system 200 provided in FIG. 2, the automatic backup link configuration engine 404 in the networking devices 202a/400 and 202b/400 may operate at block 510 to exchange heartbeat communications, as well as other communications and/or functionality that would be apparent to one of skill in the art in possession of the present disclosure, via the link 208 that has been configured as the backup link (e.g., via the configuration of the inter-chassis interfaces that provide the link 208 to provide a backup link). As such, the link 208 that has been configured as the backup link may be utilized by the networking devices 202a and 202b to determine the availability of the other networking device.

Similarly, continuing with the specific example of the automatic aggregated networking device backup link configuration system 300 provided in FIG. 3, the automatic backup link configuration engine 404 in the networking devices 202a/400 and 202b/400 may operate at block 510 to exchange heartbeat communications, as well as other communications and/or functionality that would be apparent to one of skill in the art in possession of the present disclosure, via the management link that is provided via the management link 308a, the management network 306, and the management link 308b, and that has been configured as the backup link (e.g., via the configuration of the management interfaces that provide the management links 308a and 308b to provide the backup link.) As such, the management link that is provided via the management link 308a, the management network 306, and the management link 308b, and that has been configured as the backup link, may be utilized by the networking devices 202a and 202b to determine the availability of the other networking device.

Thus, systems and methods have been described that provide for the automatic configuration of a backup link between VLT peer switch devices. For example, a pair of VLT peer switch devices may be provided with a respective inter-chassis links between respective pairs of inter-chassis interfaces on each of the VLT peer switch devices, and a VLTi may be configured between the VLT peer switch devices using those inter-chassis links. The VLT peer switch devices may then exchange information using the inter-chassis links in the VLTi, and each VLT peer switch device may then use that information to determine each of its inter-chassis interfaces that are operating to provide the VLTi (e.g., by being configured to provide an inter-chassis link that is included in the VLTi.) Each VLT peer switch device may then identify whether it includes an inter-chassis interface that is connected to the other VLT peer switch device by a link that is not part of the VLTi and, if so, enable a link local IPv6 address on that inter-chassis interface and retrieve the link local IPv6 address from the inter-chassis interface on the other VLT peer switch device that is connected via the link that is not part of the VLTi. Each VLT peer switch device may then utilize the link local IPv6 addresses associated with the inter-chassis interfaces that provide the link that is not part of the VLTi in order to automatically configure that link as a backup link that may be subsequently utilized to exchange heartbeat communications between the VLT peer switch devices.

In the event the VLT peer switch devices do not identify any inter-chassis interface that is connected to the other VLT peer switch device by a link that is not part of the VLTi (i.e., all links available via the inter-chassis interfaces are inter-chassis links that are included in the VLTi), each of the VLT peer switch devices may use the information (e.g., management IP addresses) to identify a pair management interfaces on the VLT peer switch devices that provide a management link between the VLT peer switch devices, and utilize the management IP addresses in order to automatically configure that management link as a backup link that may be subsequently utilized to exchange heartbeat communications between the VLT peer switch devices. As such, the manual configuration of backup links between VLT peer switch devices is eliminated by providing for automatic configuration of such backup links using either a link between inter-chassis interfaces on the VLT peer switch devices that is not part of a VLTi or, if no link exists between inter-chassis interfaces on the VLT peer switch devices that is not part of a VLTi, using a link between management interfaces on the VLT peer switch devices. As will be appreciated by one of skill in the art in possession of the present disclosure, the automatic configuration of the present disclosure saves time and eliminates errors associated with conventional manual process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automatic aggregated networking device backup link configuration system, comprising:
   a second networking device including a plurality of second networking device interfaces; and
   a first networking device including a plurality of first networking device interfaces, wherein the first networking device is configured to:
      receive, via at least some of the plurality of first networking device interfaces that are each coupled via a respective inter-chassis link in an aggregated inter-chassis link to respective ones of the plurality of second networking device interfaces, second networking device information;
      determine, using the second networking device information, that each of the at least some of the plurality of first networking device interfaces provide the aggregated inter-chassis link to the second networking device;
      identify one of the plurality of first networking device interfaces that is coupled to a respective one of the plurality of second networking device interfaces by a link that is not part of the aggregated inter-chassis link;
      retrieve a second link local IPv6 address from the respective one of the plurality of second networking device interfaces that is coupled to the one of the plurality of first networking device interfaces by the link that is not part of the aggregated inter-chassis link; and
      automatically configure the one of the plurality of first networking device interfaces to provide the link that is not part of the aggregated inter-chassis link as a backup link using the second link local IPv6 address.

2. The system of claim 1, wherein first networking device is configured to:
   transmit, via the at least some of the plurality of first networking device interfaces that are each coupled via the respective inter-chassis link in the aggregated inter-chassis link to the respective ones of the plurality of second networking device interfaces, first networking device information.

3. The system of claim 1, wherein the at least some of the plurality of first networking device interfaces that provide the aggregated inter-chassis link to the second networking device are inter-chassis interfaces, and wherein the one of the plurality of first networking device interfaces that is coupled to the respective one of the plurality of second networking device interfaces by the link that is not part of the aggregated inter-chassis link is an inter-chassis interface.

4. The system of claim 1, wherein the at least some of the plurality of first networking device interfaces that provide the aggregated inter-chassis link to the second networking device are inter-chassis interfaces, and wherein the one of the plurality of first networking device interfaces that is coupled to the respective one of the plurality of second networking device interfaces by the link that is not part of the aggregated inter-chassis link is a management interface.

5. An automatic aggregated networking device backup link configuration system, comprising:
a second networking device including a plurality of second networking device interfaces; and
a first networking device including a plurality of first networking device interfaces, wherein the first networking device is configured to:
receive, via at least some of the plurality of first networking device interfaces that are each coupled via a respective inter-chassis link in an aggregated inter-chassis link to respective ones of the plurality of second networking device interfaces, second networking device information;
determine, using the second networking device information, that each of the at least some of the plurality of first networking device interfaces provide the aggregated inter-chassis link to the second networking device;
identify one of the plurality of first networking device interfaces that is coupled to a respective one of the plurality of second networking device interfaces by a link that is not part of the aggregated inter-chassis link;
retrieve a second management Internet Protocol (IP) address from the respective one of the plurality of second networking device interfaces that is coupled to the one of the plurality of first networking device interfaces by the link that is not part of the aggregated inter-chassis link; and
automatically configure the one of the plurality of first networking device interfaces to provide the link that is not part of the aggregated inter-chassis link as a backup link using the second management IP address.

6. An Information Handling System (IHS), comprising:
a processing system; and
a memory system that is coupled to the processing system and that includes instructions that, when executed by the processing system, cause the processing system to provide an automatic backup link configuration engine that is configured to:
receive, via at least some of a plurality of first interfaces that are each coupled via a respective inter-chassis link in an aggregated inter-chassis link to respective ones of a plurality of second interfaces on a second networking device, second networking device information;

determine, using the second networking device information, that each of the at least some of the plurality of first interfaces provide the aggregated inter-chassis link to the second networking device;
identify one of the plurality of first interfaces that is coupled to a respective one of the plurality of second interfaces by a link that is not part of the aggregated inter-chassis link;
retrieve a second link local IPv6 address from the respective one of the plurality of second interfaces that is coupled to the one of the plurality of first interfaces by the link that is not part of the aggregated inter-chassis link; and
automatically configure the one of the plurality of first interfaces to provide the link that is not part of the aggregated inter-chassis link as a backup link using the second link local IPv6 address.

7. The IHS of claim 6, wherein the automatic backup link configuration engine is configured to:
transmit, via the at least some of the plurality of first interfaces that are each coupled via the respective inter-chassis link in the aggregated inter-chassis link to the respective ones of the plurality of second interfaces, first networking device information.

8. The IHS of claim 6, wherein the at least some of the plurality of first interfaces that provide the aggregated inter-chassis link to the second networking device are inter-chassis interfaces, and wherein the one of the plurality of first interfaces that is coupled to the respective one of the plurality of second interfaces by the link that is not part of the aggregated inter-chassis link is an inter-chassis interface.

9. The IHS of claim 6, wherein the at least some of the plurality of first interfaces that provide the aggregated inter-chassis link to the second networking device are inter-chassis interfaces, and wherein the one of the plurality of first interfaces that is coupled to the respective one of the plurality of second interfaces by the link that is not part of the aggregated inter-chassis link is a management interface.

10. An Information Handling System (IHS), comprising:
a processing system; and
a memory system that is coupled to the processing system and that includes instructions that, when executed by the processing system, cause the processing system to provide an automatic backup link configuration engine that is configured to:
receive, via at least some of a plurality of first interfaces that are each coupled via a respective inter-chassis link in an aggregated inter-chassis link to respective ones of a plurality of second interfaces on a second networking device, second networking device information;
determine, using the second networking device information, that each of the at least some of the plurality of first interfaces provide the aggregated inter-chassis link to the second networking device;
identify one of the plurality of first interfaces that is coupled to a respective one of the plurality of second interfaces by a link that is not part of the aggregated inter-chassis link;
retrieve a second management Internet Protocol (IP) address from the respective one of the plurality of second interfaces that is coupled to the one of the plurality of first interfaces by the link that is not part of the aggregated inter-chassis link; and
automatically configure the one of the plurality of first interfaces to provide the link that is not part of the aggregated inter-chassis link as a backup link using the second management IP address.

11. An Information Handling System (IHS), comprising:
a processing system; and
a memory system that is coupled to the processing system and that includes instructions that, when executed by the processing system, cause the processing system to provide an automatic backup link configuration engine that is configured to:
receive, via at least some of a plurality of first interfaces that are each coupled via a respective inter-chassis link in an aggregated inter-chassis link to respective ones of a plurality of second interfaces on a second networking device, second networking device information;
determine, using the second networking device information, that each of the at least some of the plurality of first interfaces provide the aggregated inter-chassis link to the second networking device;
identify one of the plurality of first interfaces that is coupled to a respective one of the plurality of second interfaces by a link that is not part of the aggregated inter-chassis link;
automatically configure the one of the plurality of first interfaces to provide the link that is not part of the aggregated inter-chassis link as a backup link;
transmit, to the second networking device via the backup link, first heartbeat communication; and
receive, from the second networking device via the backup link, second heartbeat communication.

12. A method for automatically configuring backup links for aggregated networking devices, comprising:
receiving, by a first networking device via at least some of a plurality of first networking device interfaces that are each coupled via a respective inter-chassis link in an aggregated inter-chassis link to respective ones of a plurality of second networking device interfaces on a second networking device, second networking device information;
determining, by the first networking device using the second networking device information, that each of the at least some of the plurality of first networking device interfaces provide the aggregated inter-chassis link to the second networking device;
identifying, by the first networking device, one of the plurality of first networking device interfaces that is coupled to a respective one of the plurality of second networking device interfaces by a link that is not part of the aggregated inter-chassis link;
retrieving, by the first networking device, a second link local IPv6 address from the respective one of the plurality of second networking device interfaces that is coupled to the one of the plurality of first networking device interfaces by the link that is not part of the aggregated inter-chassis link; and
automatically configuring, by the first networking device, the one of the plurality of first networking device interfaces to provide the link that is not part of the aggregated inter-chassis link as a backup link using the second link local IPv6 address.

13. The method of claim 12, further comprising:
transmitting, by the first networking device via the at least some of the plurality of first networking device interfaces that are each coupled via the respective inter-chassis link in the aggregated inter-chassis link to the respective ones of the plurality of second networking device interfaces, first networking device information.

14. The method of claim 12, wherein the at least some of the plurality of first networking device interfaces that provide the aggregated inter-chassis link to the second networking device are inter-chassis interfaces, and wherein the one of the plurality of first networking device interfaces that is coupled to the respective one of the plurality of second networking device interfaces by the link that is not part of the aggregated inter-chassis link is an inter-chassis interface.

15. The method of claim 12, wherein the at least some of the plurality of first networking device interfaces that provide the aggregated inter-chassis link to the second networking device are inter-chassis interfaces, and wherein the one of the plurality of first networking device interfaces that is coupled to the respective one of the plurality of second networking device interfaces by the link that is not part of the aggregated inter-chassis link is a management interface.

16. A method for automatically configuring backup links for aggregated networking devices, comprising:
receiving, by a first networking device via at least some of a plurality of first networking device interfaces that are each coupled via a respective inter-chassis link in an aggregated inter-chassis link to respective ones of a plurality of second networking device interfaces on a second networking device, second networking device information;
determining, by the first networking device using the second networking device information, that each of the at least some of the plurality of first networking device interfaces provide the aggregated inter-chassis link to the second networking device;
identifying, by the first networking device, one of the plurality of first networking device interfaces that is coupled to a respective one of the plurality of second networking device interfaces by a link that is not part of the aggregated inter-chassis link;
retrieving, by the first networking device, a second management Internet Protocol (IP) address from the respective one of the plurality of second networking device interfaces that is coupled to the one of the plurality of first networking device interfaces by the link that is not part of the aggregated inter-chassis link; and
automatically configuring, by the first networking device, the one of the plurality of first networking device interfaces to provide the link that is not part of the aggregated inter-chassis link as a backup link using the second management IP address.

17. A method for automatically configuring backup links for aggregated networking devices, comprising:
receiving, by a first networking device via at least some of a plurality of first networking device interfaces that are each coupled via a respective inter-chassis link in an aggregated inter-chassis link to respective ones of a plurality of second networking device interfaces on a second networking device, second networking device information;
determining, by the first networking device using the second networking device information, that each of the at least some of the plurality of first networking device interfaces provide the aggregated inter-chassis link to the second networking device;
identifying, by the first networking device, one of the plurality of first networking device interfaces that is coupled to a respective one of the plurality of second networking device interfaces by a link that is not part of the aggregated inter-chassis link;

transmitting, by the first networking device to the second networking device via the backup link, first heartbeat communication; and receiving, by the first networking device from the second networking device via the backup link, second heartbeat communication.

18. An automatic aggregated networking device backup link configuration system, comprising:
- a second networking device including a plurality of second networking device interfaces; and
- a first networking device including a plurality of first networking device interfaces, wherein the first networking device is configured to:
  - receive, via at least some of the plurality of first networking device interfaces that are each coupled via a respective inter-chassis link in an aggregated inter-chassis link to respective ones of the plurality of second networking device interfaces, second networking device information;
  - determine, using the second networking device information, that each of the at least some of the plurality of first networking device interfaces provide the aggregated inter-chassis link to the second networking device;
  - identify one of the plurality of first networking device interfaces that is coupled to a respective one of the plurality of second networking device interfaces by a link that is not part of the aggregated inter-chassis link; and
  - automatically configure the one of the plurality of first networking device interfaces to provide the link that is not part of the aggregated inter-chassis link as a backup link;
  - transmit, to the second networking device via the backup link, first heartbeat communication; and
  - receive, from the second networking device via the backup link, second heartbeat communication.

* * * * *